United States Patent [19]

Peetz

[11] Patent Number: 5,462,130

[45] Date of Patent: Oct. 31, 1995

[54] DRILLING TOOL

[75] Inventor: Wolfgang Peetz, Fronreute, Germany

[73] Assignee: Hawera Probst GmbH, Ravensburg, Germany

[21] Appl. No.: 220,038

[22] Filed: Mar. 30, 1994

[30] Foreign Application Priority Data

May 5, 1993 [DE] Germany .................. 43 14 868.9

[51] Int. Cl.⁶ .................. E21B 17/042; E21B 17/22
[52] U.S. Cl. .................. 175/323; 175/394
[58] Field of Search ................. 175/323, 394, 175/415; 408/230

[56] References Cited

U.S. PATENT DOCUMENTS

| | | | |
|---|---|---|---|
| 436,558 | 9/1890 | Buckingham | 175/394 X |
| 1,156,336 | 10/1915 | Wegland . | |
| 1,964,030 | 6/1934 | Brush . | |
| 2,733,943 | 2/1956 | Nater | 175/323 |
| 3,424,479 | 1/1969 | Ditson et al. | 175/394 X |
| 3,554,308 | 1/1971 | Ditson | 175/323 |
| 4,202,420 | 5/1980 | Peetz et al. | 175/395 |
| 4,262,762 | 4/1981 | Potratz | 175/401 |
| 4,363,366 | 12/1982 | Hilty | 175/394 X |

FOREIGN PATENT DOCUMENTS

| | | |
|---|---|---|
| 0322554 | 7/1989 | European Pat. Off. . |
| 0470354 | 2/1992 | European Pat. Off. . |
| 497231 | 4/1930 | Germany . |
| 1829363 | 1/1959 | Germany . |
| 1943586 | 3/1971 | Germany . |
| 1752616 | 5/1971 | Germany . |
| 2213535 | 10/1972 | Germany . |
| 2246965 | 4/1974 | Germany . |
| 2505555 | 8/1975 | Germany . |
| 2455996 | 6/1976 | Germany . |
| 2735368 | 2/1979 | Germany . |
| 2756140 | 6/1979 | Germany . |
| 2811977 | 9/1979 | Germany . |
| 8328156.8 | 12/1983 | Germany . |
| 3825107 | 1/1990 | Germany . |

OTHER PUBLICATIONS

"Heller Ratio–Werkzeugsystem" (Heller ratio tool system), 1 page.

Primary Examiner—Hoang C. Dang
Attorney, Agent, or Firm—Spencer, Frank & Schneider

[57] ABSTRACT

A drilling tool and, in particular, a rock drill, which is of multi-part design, is proposed. In this, the drill head and/or the clamping shank is connected via a helical shank designed as a threaded rod.

8 Claims, 1 Drawing Sheet

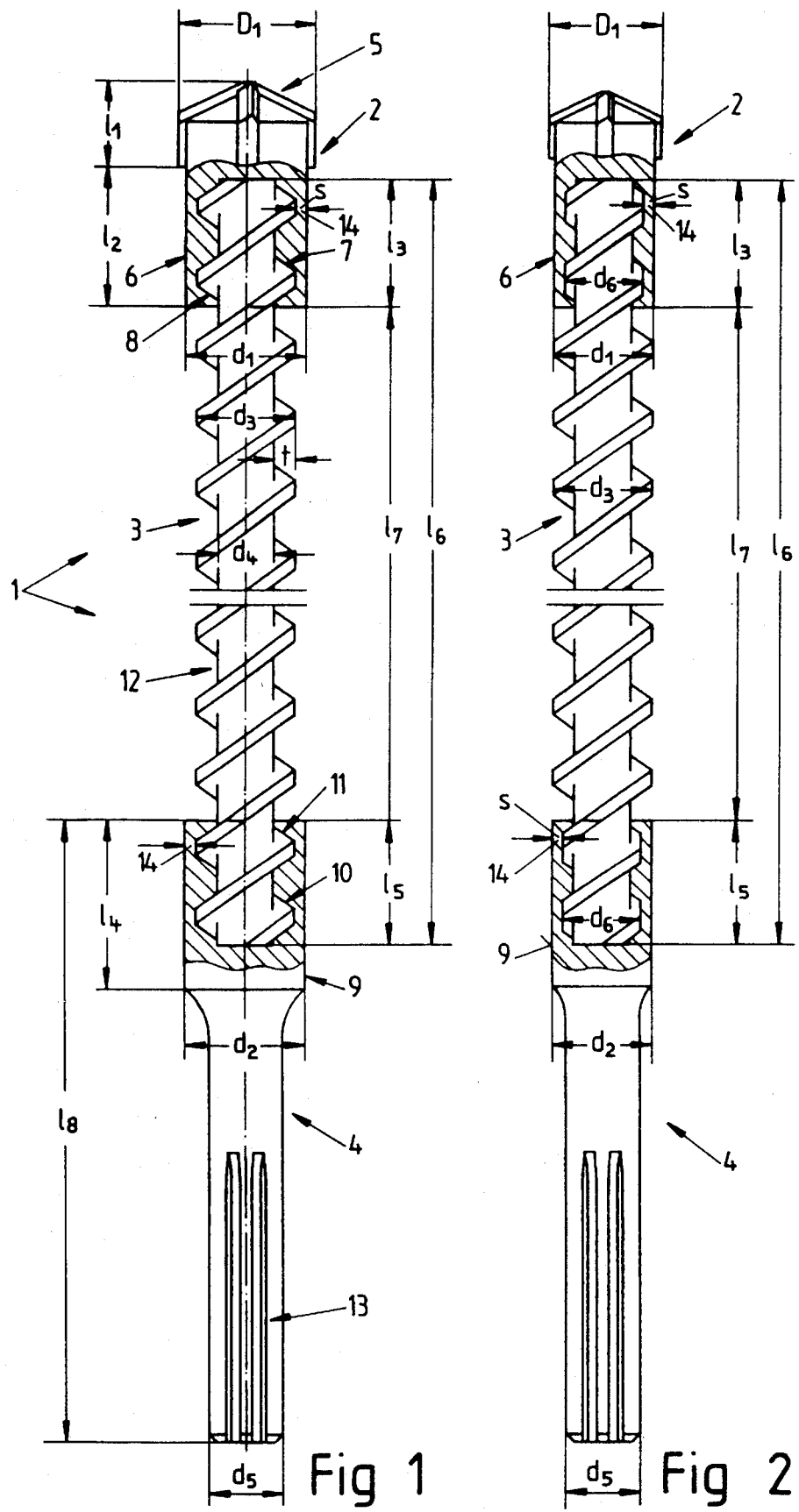

DRILLING TOOL

BACKGROUND OF THE INVENTION

The invention relates to a drilling tool comprising a drill head, a clamping shaft, and a helical shaft interposed between the drill head and clamping shaft.

Drilling tools composed of a plurality of individual parts are known. The multi-part nature of these relates not only to the insertion of carbide bits into the drill head, but to the multi-part design of the drill head and/or helical shank and/or clamping shank.

German Offenlegungsschrift 2,246,965 discloses, for example, a twist drill, in which the drill head and the helical shank are of two-part design, the drill head being attached positively onto the helical shank and being fixedly connected to the latter by a soldered joint. The purpose of such a multi-part joint is the employment of different materials for the two parts and, in particular, the use of a carbide drill head as a wear-resistant part. German Utility Model GM 83 28 156 has a similar design, and in this the drill head is subsequently connected to a drill rod and the parts are braced relative to one another via a transversely extending clamping sleeve. As a result, the drill head can be released from the drill rod in a simple way.

The two-part joint between the helical shank and the clamping end is likewise known. For example, German Offenlegungsschrift 2,811,977 discloses a carbide twist drill which is of two-part design in the region of the clamping shank, a press fit holding the parts firmly together.

A catalogue of Messrs Heller discloses, under the designation "Heller Ratio-Werkzeugsystem" ["Heller ratio tool system"], drilling tools for concrete and rock, the clamping ends of which have separate threaded extensions screwed into special drill receptacles or drill couplings which are themselves arranged fixedly in a machine tool. A drill change then takes place by the release of the threaded stem.

All the known solutions are based on the fundamental principle of connecting either the drill head or the clamping end to an, if appropriate, intermediate helical shank of a conveying helix, a fixed or releasable connection being used. A releasable connection can then be, for example, an additionally attached threaded device. The conveying helix itself is always selected irrespective of the connection of the individual parts which is to be selected.

SUMMARY OF THE INVENTION

The object on which the invention is based is to provide a drilling tool, in which the design of the conveying helix contributes decisively to the connection of the individual parts.

Proceeding from a drilling tool of the type designated in the introduction, this object is achieved, according to the invention, by providing the helical shaft with a conveying helix extending an entire length of the shaft for conveying rock dust. The drill head and the clamping shaft are threadably fastenable to the helical shaft via the conveying helix.

The invention is based on the essential idea that as simple a construction as possible of the multi-part drilling tool can be achieved when the helical shank used for conveying the drilling dust serves at the same time as a fastening thread for the drill head and/or for the clamping shank. As a result, the helical shank, made from rod stock of a possibly commercially available threaded rod, can be used, for example, with a trapezoidal thread or the like, the threaded rod serving for the threaded connection to the drill head and/or clamping shank and, at the same time, as a conveying helix. The helical rod can be used so as to be capable of being shortened as desired, so that the length of the drilling tool is variable in a simple way. An exchangeable drill head for the most diverse machining jobs can be screwed onto such a helical rod in a simple way and, if appropriate, exchanged in the event of wear.

Likewise, the insertion end or clamping shank can easily be screwed onto the helical rod and be exchanged in the event of wear or when the clamping chuck is changed. A high flexibility is thereby guaranteed for every hammer drill as a result of a simple coupling exchange.

The individual parts, because they are easily separable, can also be subjected in a simple way to a recycling process, since a material separation, particularly in respect of the helical shank and the clamping shank, is not necessary since they are in one piece. Only the drill head would have to be treated separately on account of the soldered-in carbide bits.

BRIEF DESCRIPTION OF THE DRAWINGS

Further particulars and advantages of the invention emerge from the exemplary embodiments illustrated in the drawing and described in more detail hereafter. In the drawing FIG. 1 shows a three-part drilling tool of standard design, and FIG. 2 shows an alternative embodiment having an adapted outside diameter of the individual parts.

DESCRIPTION OF A PREFERRED EMBODIMENT

The three-part drilling tool 1 illustrated in FIG. 1 is designed as a rock drill and consists of a drill head 2, a helical shank 3 and a clamping shank 4 for reception in a machine tool.

The drill head 2 has carbide tips 5 of an outside diameter $D_1$ which form the nominal drill diameter. The axial length region $l_1$ of the carbide tips 5 has adjoining it a largely cylindrical casing region 6 of the drill head 2 having the length $l_2$. Located within this drillhead portion 6 over the axial length $l_3$ is an internal-thread portion 7 which serves for receiving an associated external-thread portion 8 of the helical shank 3.

The clamping shank 4 likewise has a cylindrical casing portion 9 of the length $l_4$, which has an internal-thread portion 10 with the length $l_5$ for receiving an associated external-thread portion 11 of the helical shank 3.

The outside diameter $d_1$ of the cylindrical casing portion 6 of the drill head 2 is smaller than the nominal diameter $D_1$ of the carbide tips 5, so that a transport of drilling dust can also take place in the length portion $l_2$. If appropriate, the length portion 6 can have, on its outer casing surface, additional drilling-dust conveying grooves (not shown) which adjoin a correspondingly adapted drill-head end region.

The outside diameter $d_2$ of the cylindrical casing portion 9 is made approximately as large as the outside diameter $d_1$ of the cylindrical casing portion 6. These diameters $d_1 \approx d_2$ are selected of a size so large that the internal thread 7, 10 for receiving the associated external thread 8, 11 of the helical shank 3 allows the associated wall having a thickness s (reference symbol 14) to have sufficient strength against breaking. Optimization between the outside diameter $d_1$, $d_2$ necessary for achieving a sufficient wall thickness s and the associated lengths $l_3$, $l_5$ can be carried out in the particular individual case.

According to the invention, the single-flight or multi-flight helical shank 3, with its total length $l_6$ and its effective conveying length $l_7$, is designed as a threaded rod, the threaded rod having both the function of the threaded connection between the drill head 2 and helical shank 3 and the helical shank 3 and clamping end 4 respectively and the function of conveying the drilling dust. Expediently, therefore, the helical shank 3 will be provided with an external thread which fully satisfies both properties. This can take place, for example, by means of a trapezoidal thread having a high ratio between the outside diameter (i.e., the mason diameter) $d_3$ and core diameter (i.e., the minor diameter) $d_4$, whilst the depth t of the drilling-dust groove shall be sufficiently large. Thus, the depth t of the drilling-dust groove 12 is $$t = \left( \frac{d_3 - d_4}{2} \right).$$

A suitable commercially available threaded rod or a threaded rod, such as became known, for example, as a helical shank from EP 0,322,554 B1 of the applicant, can also be used as a helical shank 3. Attention is hereby drawn to the substantive content of this publication.

In the exemplary embodiment according to FIG. 1, the helical shank 3 has an identical outside diameter $d_3$ extending over its entire length $l_6$, that is to say the internal thread 7, 10 in the drill head 2 and in the clamping shank 4 respectively is adapted to this external thread. The helical shank can consequently be used as rod stock which can be cut to length, the drill head and clamping shank being screwed onto the cut-to-length rod.

In FIG. 1, the total length of the clamping shank 4 is indicated by $l_8$ and the diameter of the clamping shank by $d_5$ for the sake of completeness. The clamping shank 4 has an insertion end 13 adapted to a machine tool.

The exemplary embodiment according to FIG. 2 differs from the exemplary embodiment according to FIG. 1 basically in that, here, an attempt is made as far as possible to avoid a diametral step between the outside diameter $d_1$ of the cylindrical casing portion 6 of the drill head 2 and the helical-shank diameter (major diameter) $d_3$ of the conveying helix 3 ($d_1 \approx d_3$).

Likewise, the outside diameter $d_2$ of the cylindrical casing portion 9 of the clamping shank 4 is also to be equal or approximately equal to the outside diameter (major diameter) $d_3$ of the conveying helix 3.

To make this possible, the two threaded portions 7, 8 in the drill head 2 and the threaded portions 10, 11 in the clamping shank 4 are made reduced in their respective diameters $d_6$ in order to obtain a sufficient remaining wall thickness s (reference symbol 14). For this purpose, the length portions $l_3$, $l_5$ of the helical shank 3 which form the connecting thread are provided with an external-thread diameter (major diameter) $d_6$ which is smaller than the outside diameter (major diameter) $d_3$ of the conveying-helix portion having the length $l_7$. In so far as the remaining wall thickness 14 is designated by s, $d_3 \approx d_6 + 2s$ is true. The threaded rod for forming the helical shank 3, which preferably has a constant minor diameter along its length, is therefore latheturned to a smaller dimension $d_6$ in the length portions $l_3$, $l_5$.

The invention is not restricted to the exemplary embodiments illustrated and described. On the contrary, it also embraces all developments made by an average person skilled in the art within the scope of the idea according to the invention.

I claim:

1. A rock drill, comprising:
   a drill head;
   a clamping shaft; and
   a helical shaft having a constant minor diameter and being interposed between said drill head and said clamping shaft, said helical shaft comprising:
      a central portion having a first major diameter;
      two end portions each having a second major diameter smaller than the first major diameter; and
      a continuous conveying helix extending along said helical shaft for conveying rock dust; said conveying helix having opposite end portions corresponding to respective said end portions of said helical shaft; said drill head and said clamping shaft being threaded onto respective said end portions of said conveying helix to threadably fasten said helical shaft to said drill head and said clamping shaft; the major diameters being measured between diametrically opposite points on an outer face of said helix; said minor diameter being measured between diametrically opposite points of a root of said helix.

2. A rock drill as defined in claim 1, wherein said conveying helix comprises a trapezoidal thread.

3. A rock drill as defined in claim 1, wherein said drill head and said clamping shaft each include a threaded receptacle for receiving said helical shaft, and at least one of said drill head and said clamping shaft has an essentially cylindrical outer casing surface in a region of said threaded receptacle.

4. A rock drill as defined in claim 3, wherein said drill head comprises an outer casing surface having drilling-dust grooves.

5. A rock drill as defined in claim 3, wherein said drill head comprises an outer casing surface having a first diameter, and a carbide tip having a second diameter larger than the first diameter.

6. A rock drill as defined in claim 1, wherein said drill head and said clamping shaft each includes a threaded receptacle for receiving said helical shaft, each said drill head and said clamping shaft has an outer casing surface in a region of a respective threaded receptacle, and each said outer casing surface has a diameter essentially equal to said first major diameter of said helical shaft.

7. A rock drill as defined in claim 1, wherein said conveying helix has one of a single flight and multi-flight.

8. A rock drill as defined in claim 1, wherein said conveying helix has a twisted longitudinal profile.

* * * * *